United States Patent [19]

Schrijver et al.

[11] 4,350,894

[45] Sep. 21, 1982

[54] IRRADIATION APPARATUS

[75] Inventors: Gerrit J. Schrijver; Jorrit Wijtsma, both of Drachten, Netherlands

[73] Assignee: U.S. Philips Corporation, New York, N.Y.

[21] Appl. No.: 241,806

[22] Filed: Mar. 9, 1981

Related U.S. Application Data

[63] Continuation of Ser. No. 39,715, May 17, 1979, abandoned.

[30] Foreign Application Priority Data

Jun. 13, 1978 [NL] Netherlands ........................ 7806373

[51] Int. Cl.[3] .......................... G01J 1/00; H05G 1/30

[52] U.S. Cl. .................................. 250/504 R; 378/96

[58] Field of Search ............... 250/402, 413, 414, 415, 250/504, 503, 494; 235/104; 315/360

[56] References Cited

U.S. PATENT DOCUMENTS 2,091,697 8/1937 Wolf .................................... 250/415

3,075,082 1/1963 Kiesel .................................. 250/415

FOREIGN PATENT DOCUMENTS 299441 6/1972 Austria .

*Primary Examiner*—Bruce C. Anderson

*Attorney, Agent, or Firm*—Thomas A. Briody; William J. Streeter; Rolf E. Schneider

[57] ABSTRACT

There is provided an irradiation apparatus having two timers which are set for the desired exposure by means of a control member. Should one of the timers become defective, the control member is blocked in its inactive position so that further use of the irradiation apparatus is made impossible.

1 Claim, 1 Drawing Figure

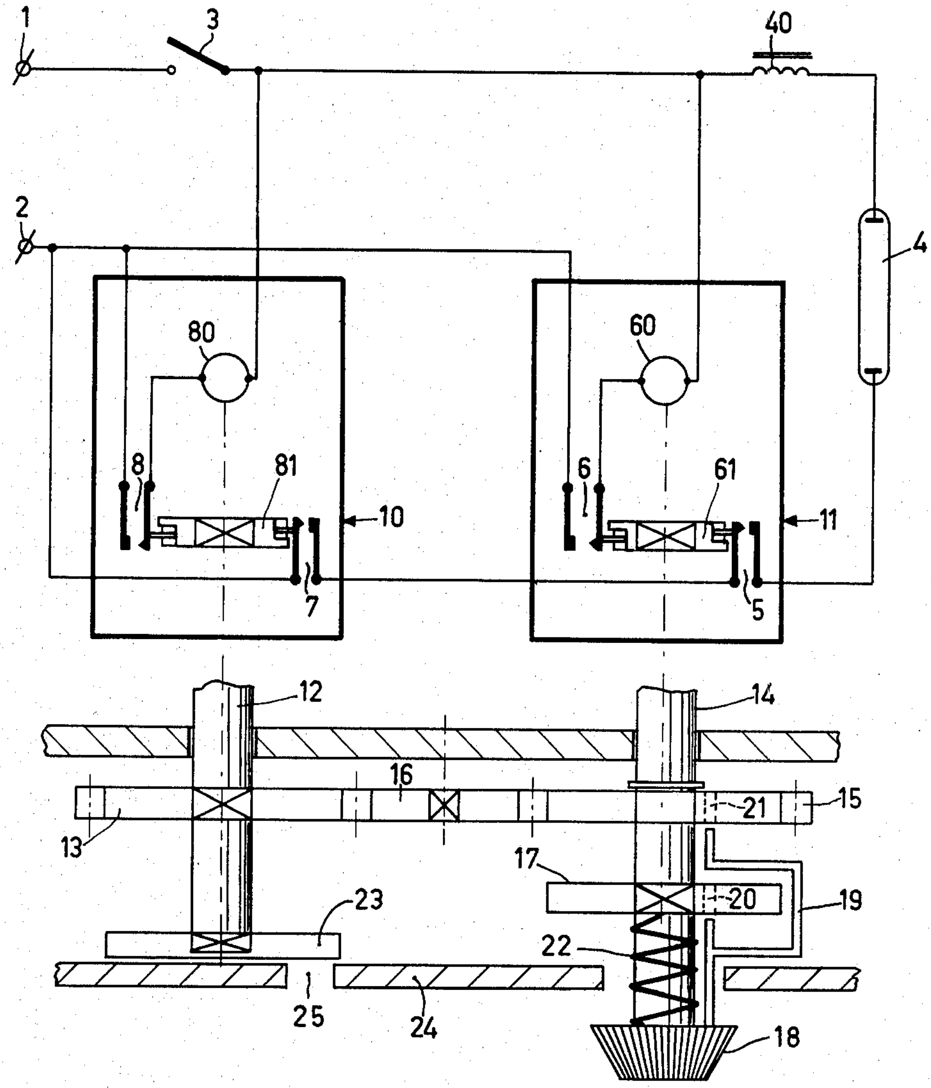
1
3
40
2
4
80
60
8
81
6
61
10
11
7
5
12
14
16
21
15
13
17
20
19
23
22
25
24
18

IRRADIATION APPARATUS

This is a continuation of application Ser. No. 039,715, filed May 17, 1979 abandoned.

This invention relates to an irradiation apparatus, comprising a radiation source and two adjustable timers which are coupled to an auxiliary device for terminating irradiation by the radiation source at the end of a set period, in which, should one of these timers become defective during the irradiation, the other timer terminates the irradiation via the auxiliary device at the end of its set period, each timer comprising a respective adjusting disk which steadily moves with the relevant timer during the irradiation from a set position to a zero position, it being possible to set the period of both timers simultaneously by way of a common control member which has an active position in which the two adjusting disks are coupled together for the purpose of setting both timers by said member and a rest position in which the adjusting disks are not coupled together.

A device of this kind is known from Austrian Pat. No. 299,441.

A drawback of this known device consists in that, should one of the two timers become defective, the irradiation apparatus can be switched on again. Then there is the risk that the other timer also becomes defective, so that the irradiation by the radiation source will not be terminated afer expiration of the adjusted exposure time. The person subjected to the radiation is then likely to receive an excessive radiation dose, which is, of course, highly undesirable. The present invention has for its object to eliminate this risk.

This objective is accomplished in accordance with the invention by providing a blocking means which, should either one of the adjusting disks be in a position other than zero when the irradiation has been terminated, blocks displacement of the control member to the active position.

An advantage of such an irradiation apparatus consists in that, after one of the two timers has become defective, the irradiation apparatus cannot be used again until the defective timer has been repaired.

Termination of irradiation can be realised in various manners. For example, it can be performed by the opening of a switch in the electrical circuit in which the radiation circuit is included. Another possibility consists in that a radiation impermeable shield is introduced between the radiation source and the person or the object being irradiated.

The blocking means may consist of, for example, a pin-and-hole connection where the pin can enter a hole in a shaft.

In an embodiment of an irradiation apparatus in accordance with the invention, the blocking means consists of a combination of a portion of the control member and one of the adjusting disks, the said portion of the control member engaging solely a local profile variation of each of the two adjusting disks in the active position of the control member.

An advantage of this embodiment of the blocking means consists in that a very simple construction is thus realised.

A local profile variation is formed, for example, by a recess in an annular, upright edge provided on an adjusting disk.

In a further embodiment in accordance with the invention, the local profile variation in each of the two adjusting disks consists of a hole, said portion of the control member comprising two pins which are located in the respective holes in the adjusting disks in the active position of the control member.

An advantage of such a construction consists in that the manufacture of the disks is simple.

In yet a further embodiment of an irradiation apparatus in accordance with the invention, the control member comprises a knob to which the pin-shaped member is connected, the knob being mounted on a shaft and the two adjusting disks also being mounted on this shaft, one adjusting disk being rigidly mounted on the shaft while the other adjusting disk is freely rotatable around this shaft.

An advantage of this embodiment consists in that the number of components is very small.

An arrangement comprising two adjustable timers, particularly suitable for an irradiation apparatus, may consist of, for example, two spring-actuated timing mechanisms.

An embodiment of a device in accordance with the invention comprises means which, should one of the adjusting disks be in a position other than zero upon expiration of the time adjusted on the timers, blocks displacement of the control member to the active position, the timers being electrically driven. An advantage of this embodiment of a device comprising two timers consists in that the timers can be powered by the same voltage source as the radiation source of the irradiation apparatus.

The invention will now be described in detail with reference to the accompanying diagrammatic drawing of a preferred ebodiment of the same. As shown, the present irradiation apparatus includes input terminals 1 and 2 for connection to an alternating voltage source of approximately 220 V, 50 Hz. Terminal 1 is connected to one side of a mains on-off switch 3. The other side of this switch is connected to the ballast inductor 40 of a high-pressure mercury vapour discharge tube 4. In the operating condition, this tube generates ultraviolet radiation. The other side of the tube 4 is connected to one contact of a switch 5 forming part of a timer 11. The other contact of this switch is connected to one contact of a switch 7 forming part of another timer 10. The switch 7 is constructed in the same manner as the switch 5. The other contact of the switch 7 is connected to the input terminal 2. The construction of these timers is substantially identical. The timers are constructed as follows. A second switch 6, 8 is provided in each timer 11, 10 respectively.

One contact of each switch 6, 8 is connected to the input terminal 2. The other contact of each switch 6, 8 is connected to the pole of an electric motor 60, 80, respectively. The other pole of this motor 60, 80 is connected to the mains on-off switch 3. The timer 10 includes an adjusting shaft 12 mechanically coupled to the shaft of the motor 80 such that the adjusting shaft 12 can be rotated through an angle of only 300°.

The timer 11 includes an adjusting shaft 14 mechanically coupled to the shaft of the motor 60 in the same way as the adjusting shaft 12 and the shaft of the motor 80 are coupled.

The shafts 12, 14 (each partly denoted by a broken line) are provided with respective cam disks 81 and 61. The cam disk 61 operates the switches 5 and 6 and is so profiled that the switches are open in only one rotary position of shaft 14 and closed in any other rotary position. The same applies to the cam disk 81 and switches 7 and 8.

On the shaft 12 there is provided a gearwheel 13. The end of the shaft 12 is provided with a second disk 23. On this disk there is provided a scale gradation with digits so that the adjusted exposure time or the remaining exposure time can be read through a window 25 in a panel 24. On the shaft 14 there is provided a first adjusting disk 15 which is constructed as a gearwheel. Between the gearwheels 13 and 15 there is provided an auxiliary gearwheel which is denoted by the reference numeral 16. On the shaft 14 there is also provided a second adjusting disk 17. The end of the shaft 14 is provided with a control knob 18. A helical restoring spring 22 is mounted between the adjusting disk 17 and the control knob 18. The reference numeral 19 denotes a control lever. This control lever is connected to the control knob 18 and can cooperate with a hole or opening 20 in the adjusting disk 17 as well as with a hole or opening 21 in the adjusting disk 15. The disks 13, 16, 17 and 23 are rigidly mounted on the relevant shafts. The disk 15 can freely rotate around its shaft 14.

First the situation where both timers are completely in order will be described.

A given exposure time is adjusted by turning the adjusting knob 18 clockwise. To this end, however, this knob is first moved from its rest position to an active position. This means that the knob is pressed against the restoring force of the helical spring 22, with the result that the lever 19 is slid into the relevant holes 20 and 21. When the adjusting knob 18 is turned, the two timers 10 and 11 are turned to the desired position, and the switches 5, 6 and 7, 8 are closed. Now knob 18 is released and by the force of the helical restoring spring 22 knob 18 is restored to its rest position, for example, against a not shown backstop. Subsequently, a person is positioned underneath the discharge tube 4 and, after the closing of the main switch 3, the exposure commences. At the same time, the two motors start to operate until their adjusting disks have both returned to the zero position. At this instant, said switches 5, 6, 7 and 8 are opened.

Now the situation will be described where one of the timers becomes defective during irradiation. Initially, the situation is the same as in the above case. However, from the instant at which one of these timers becomes defective, its relevant adjusting disk, i.e. either the adjusting disk 17 or the adjusting disk 15 will no longer rotate. The switch of the timer which is still in order will switch off the discharge tube 4. But the situation is then such that, because the adjusting disk of the defective timer has stopped turning, the control knob 18 can no longer be set to said active position, because the lever 19 abuts against the flange of one of the adjusting disks (17 and 15).

An advantage of the described device consists in that the user of such irradiation apparatus can no longer continue the irradiation during which he would be subject to the risk that the second timer could also become defective, so that he would be exposed to an excessively high dose of ultra-violet radiation. Moreover, if the apparatus were negligently allowed to remain switched on, automatic switching off might not occur in those circumstances. This could even cause a fire.

Before further use of an irradiation apparatus in accordance with the invention the defective timer will first have to be repaired.

What is claimed is:

1. Irradiation apparatus, which comprises an ultra-violet radiation source; two timers each adjustable to a selected period; means respectively associated with said two timers for terminating irradiation by the radiation source at the end of the selected period; an adjusting disk associated with each timer and movable therewith between a set position corresponding to said selected period and a zero position, each adjusting disk being provided with an opening; a control member movable from an inactive position to an active position for coupling the two adjusting disks together to simultaneously set both timers for said selected period, said control member having two pins respectively positionable in the openings in the adjusting disks; and a shaft having the two adjusting disks positioned thereon, one adjusting disk being affixed to the shaft and the other adjusting disk being freely rotatable on the shaft, whereby movement of the control member to its active position is prevented should either adjusting disk be in other than the zero position when the irradiation has been terminated.

* * * * *